(Model.)
M. W. WILKINS.
PUMP.
No. 247,863. Patented Oct. 4, 1881.
2 Sheets—Sheet 1.
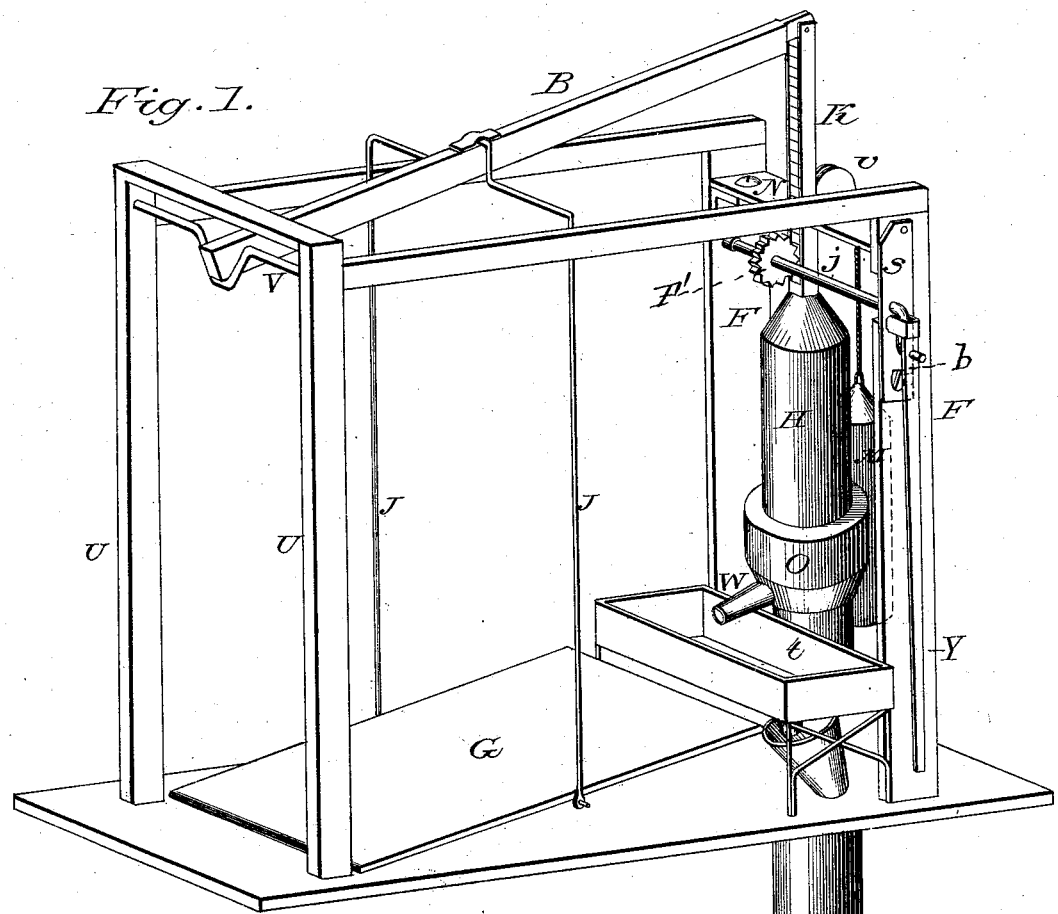
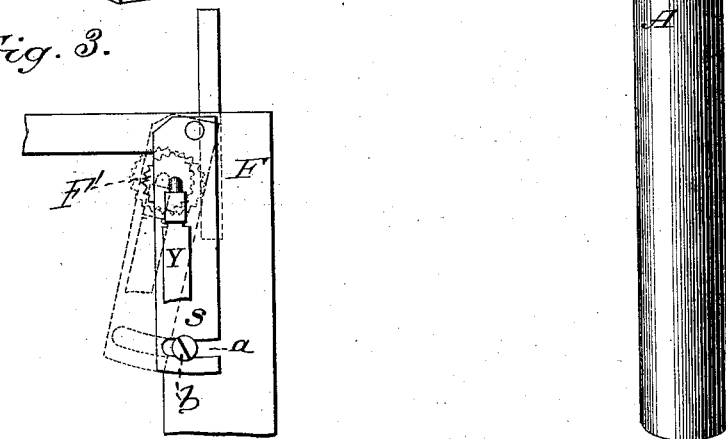
Witnesses:
Inventor:
Miles Wesley Wilkins (Model.)
M. W. WILKINS.
PUMP.
No. 247,863.
2 Sheets—Sheet 2.
Patented Oct. 4, 1881.
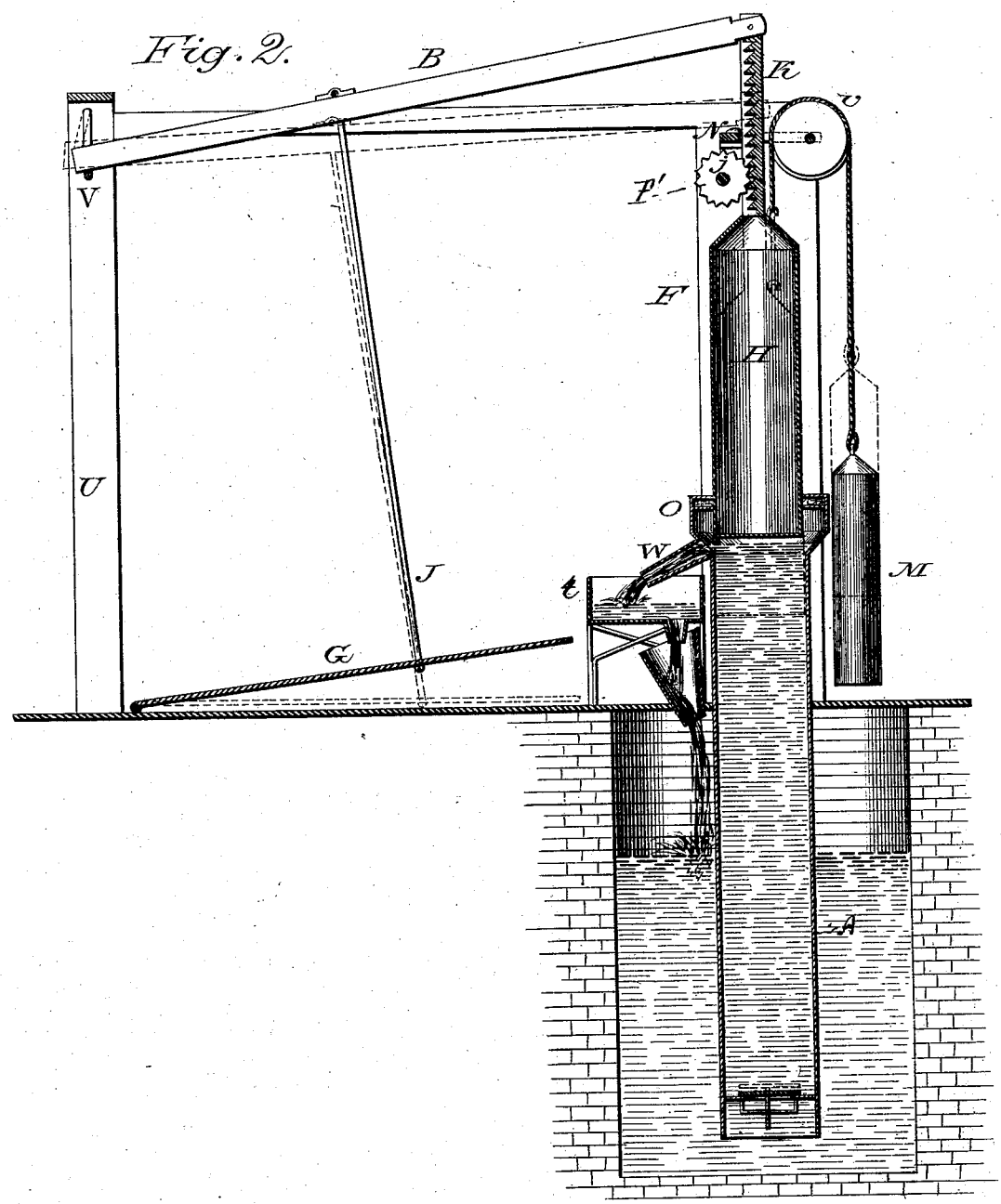
Witnesses:
Wallace Bellows
Thomas E. Culton
Inventor:
Miles Wesley Wilkins

UNITED STATES PATENT OFFICE.

MILES W. WILKINS, OF CORVALLIS, OREGON.

PUMP.

SPECIFICATION forming part of Letters Patent No. 247,863, dated October 4, 1881.

Application filed March 29, 1880. (Model.)

*To all whom it may concern:*

Be it known that I, MILES WESLEY WILKINS, of Corvallis, in the county of Benton and State of Oregon, have invented certain new and useful Improvements in Pumps; and I do hereby declare that the following is a full, clear, and exact description of the same, reference being had to the accompanying drawings, forming a part of this specification, in which—

Figure 1 is a view in perspective of a pump embodying my improvements. Fig. 2 is a vertical sectional view, and Fig. 3 is a detail view.

This invention has relation to pumps; and it consists in the improved features of construction and combination hereinafter fully described, and particularly pointed out in the claims.

Referring by letter to the accompanying drawings, A designates the pump-stock, H the plunger, and K the pump-rod having a ratcheted inner face.

A frame composed of uprights F F U U and connecting-girders is erected either from the ground or a floor, and a hinged platform, G, is supported therefrom by rods J J, connected to a beam, B, secured at one end to a pivoted rod, V, and connected at its other end to the pump-rod K. This pump-rod K passes through slot in a cross-bar, N, said slot serving as a guide for the pump-rod, and the cross-bar N carries a pulley, $v$, over which a cord attached to the pump-rod K by means of a hook or otherwise passes, and is provided at its end with a weight, M.

A shaft, $j$, has one of its bearings stationary in one of the uprights F, the other being in a pivoted arm, S, attached to the opposite upright F. This latter post F is notched to receive the shaft $j$, and the lower end of the pivoted arm S is slotted at $a$, and a set-screw, $b$, is employed to bind it to the upright when necessary. A cog-wheel, F', is secured to the shaft $j$, and is intended to mesh with the ratcheted pump-rod K when the arm S is secured to place on the upright F.

It will be observed that when the arm S is swung out of place it may be secured by the set-screw $b$ in such a position as to hold the cog-wheel F' out of mesh with the ratchet on the pump-rod K. One end of the shaft $j$ is provided with a crank, and a pendulum-lever, Y, is connected to this crank, in order that the pump may be operated by hand when it is not desired to water the cattle.

W designates the pump-spout, and $t$ the water-trough beneath it. The trough is provided with an outlet in its bottom, which communicates with a funnel leading back to the well, for conveying surplus water back to the well.

The pump is operated by the weight of the animal upon the platform G. The weight M holds the plunger elevated until it is caused to descend by the animal upon the platform G. Only one animal at a time can approach the water-trough, and as soon as the animal leaves the platform the weight M brings the plunger back to its normal position. By throwing the gear-wheel F' out of mesh with the rack of the pump-rod the animal only can operate the pump; but by placing the gear and rack in mesh the pendulum-lever Y or the crank on the shaft $j$ may be used to operate the pump by hand.

O designates a packing-ring.

Having thus fully described my invention, what I claim as new and useful, and desire to secure by Letters Patent, is—

1. In a pump, the combination, with the pump-rod K, having the plunger H, of the pivoted beam B, having rods J J, for supporting the hinged platform G, pulley $v$, cord, and weight M, substantially as and for the purposes set forth.

2. In a pump, the combination of the ratcheted pump-rod K, having plunger H, of the shaft $j$, having the cog-wheel F' and crank $b$, pendulum Y, and the pivoted arm S, substantially as and for the purposes set forth.

MILES WESLEY WILKINS.

Witnesses:
WALLACE BALDWIN,
THOS. E. CAUTHORN.